P. C. HAUBOLD.
DOUGH RAISER.
APPLICATION FILED FEB. 9, 1918.

1,276,651.

Patented Aug. 20, 1918.
2 SHEETS—SHEET 1.

Witnesses
Inventor
P. C. Haubold

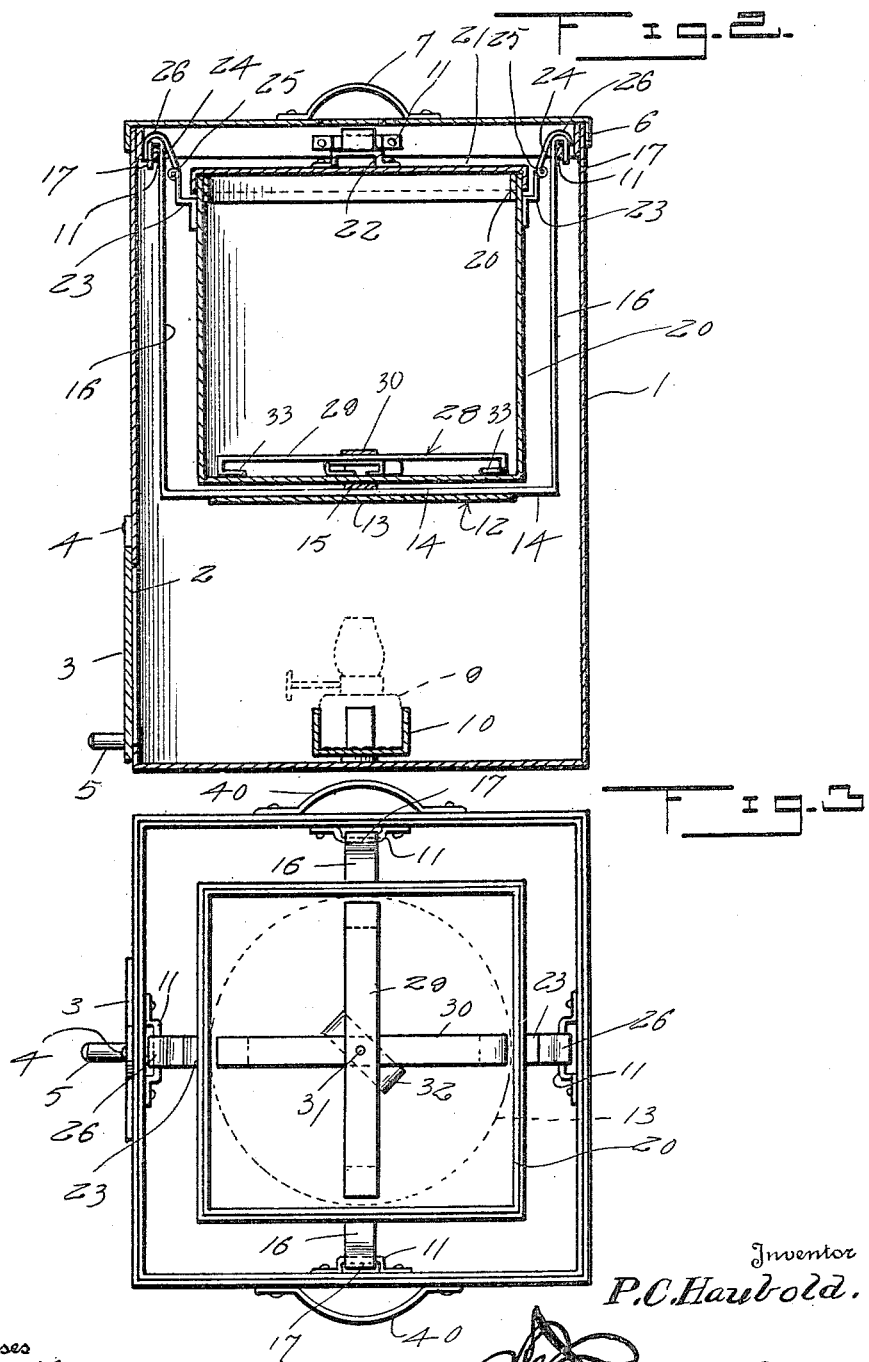

UNITED STATES PATENT OFFICE.

PAUL C. HAUBOLD, OF NAPONEE, NEBRASKA.

DOUGH-RAISER.

1,276,651.

Specification of Letters Patent.

Patented Aug. 20, 1918.

Application filed February 9, 1918. Serial No. 216,254.

*To all whom it may concern:*

Be it known that I, PAUL C. HAUBOLD, a citizen of the United States, residing at Naponee, in the county of Franklin and State of Nebraska, have invented certain new and useful Improvements in Dough-Raisers; and I do hereby declare the following to be a full, clear, and exact description of the invention, such as will enable others skilled in the art to which it appertains to make and use the same.

This invention relates to a dough raiser, and the primary object of the invention is to provide a dough raiser including an inclosed casing in which is suspended a dough retaining receptacle and beneath which dough retaining receptacle is positioned a lamp or other suitable heating device for heating the interior of the heating or retaining receptacle so that the dough within the dough retaining receptacle will be heated and the raising thereof facilitated.

A further object of this invention is to provide a spider structure which is positioned within the dough retaining receptacle, upon the upper surface of the bottom of the same to prevent the dough from engaging the bottom of the dough retaining receptacle and consequently being dried by the heat from the lamp.

With the foregoing and other objects in view this invention consists in such novel features of construction combination and arrangement of parts as will be hereinafter more fully described illustrated in the accompanying drawings and claimed.

In describing the invention in detail, reference will be had to the accompanying drawings wherein like characters designate like and corresponding parts throughout the several views and in which:

Fig. 2 is a vertical section through the dough raiser

Fig. 3 is a top plan of the dough raiser having the cover removed

Figure 1:
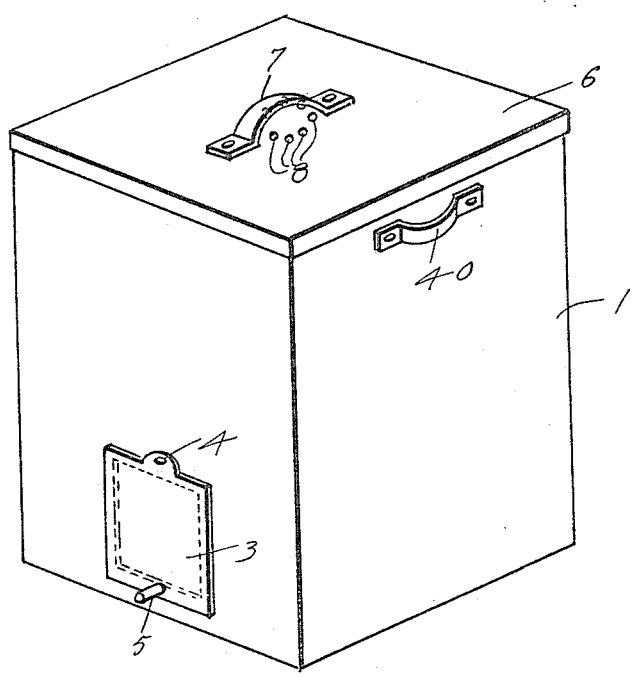
Figure 1 is a perspective view of the improved dough raiser
Figure 4:
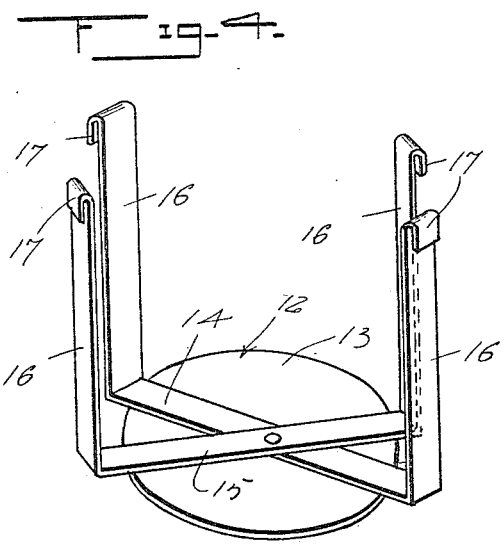
Fig. 4 is a perspective view of the dough retaining pan support.
Figure 5:
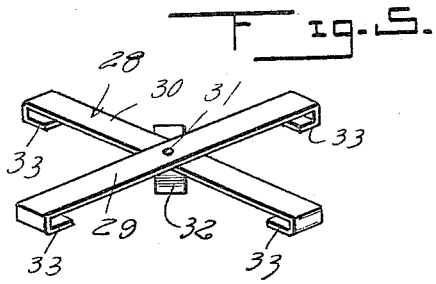
Fig. 5 is a detail perspective view of the spider to be positioned within the dough retaining receptacle.

Referring more particularly to the drawings, 1 designates the heating chamber of the dough raiser which is provided with a door opening 2. The door opening 2 is normally closed by a swingable door 3, which is mounted upon a pin 4 and has a handle 5 carried thereby for facilitating the swinging movement of the door into an opened and closed position.

The heating chamber 1 has its upper end open and closed by a removable cover 6 upon the upper surface or top of which cover is mounted a hande 7. The cover 6 is provided with a plurality of openings 8 formed therein to permit air circulation within the heating chamber so as to allow a lamp or analogous heating device as indicated in dotted lines at 9, in Fig. 2 of the drawings to burn therein for the heating of the interior of the compartment. A suitable heater support 10 is attached to the inner surface of the bottom of the heating compartment 1 centrally thereof and it forms a support for holding the lamp or heater 9.

The sides of the compartment 1 have straps 11 attached thereto, near the top of the compartment which straps are bowed outwardly from the inner surface of the vertical sides of the heating compartment to form supports for the dough containing receptacle supporting structure 12.

The supporting structure 12 comprises a flat disk 13 which has a pair of U-shaped members 14 and 15 attached to its upper surface. The legs 16 of the U-shaped members 14 and 15 have their upper ends bent downwardly upon themselves to form loops or hooks as shown at 17, which loops or hooks engage over the spaced or bowed portions of the straps 11, for supporting the support 12 within the heating compartment 1.

The dough retaining receptacle 20 rests upon the support 12, which support suspends the retaining receptacle 20 within the compartment 1, permitting space about all sides of the retaining receptacle in which the heat from the lamp or heater 9 circulates, for heating the receptacle 20 and dough which is placed therein to facilitate the raising of the dough. The receptacle 20 has its upper end open, and closed by a cover 21 which cover is provided with a handle 22 to facilitate its positioning upon or removal from the receptacle 20.

A pair of angled brackets 23 are attached to opposite sides of the dough retaining receptacle 20 and they have plates 24 hingedly connected thereto as shown at 25. The plates 24 have their upper ends bent to form hooks 26 which engage over an opposed pair of the hooks 17, as clearly shown in Fig. 2 of the drawings, to hold the dough receptacle 20 against rocking, and also to assist the support 12 in properly supporting the dough receptacle within the compartment 1.

A spider structure 28 is positioned within the dough retaining receptacle 20 and it rests upon the bottom of the same. The spider structure 28 comprises a pair of crossed bars 29 and 30 which have their encrossed portions connected by a pin or rivet 31 which also connects the crossed bars 29 and 30 to a central supporting bar 32 which is considerably shorter than the bars 29 and 30. The bars 29 and 30 and the short central supporting bar 32 have their ends bent to form angular portions 33 which rest upon the upper surface of the bottom of the dough retaining compartment for supporting the bars 29 and 30 above the bottom of the dough retaining receptacle. The spider structure 28 is provided for holding the dough on the bottom of the dough retaining receptacle so that the lower portion of the dough will be prevented from drying by the heat from the lamp 9.

The circular disk or plate 13 of the supporting structure 12 forms a baffle for distributing the heat from the lamp or heater 9.

The heating compartment 1 has a pair of handles 40 attached to the sides of the same, which handles are provided for facilitating the carrying of the dough raiser from one place to another.

In reducing the invention to practice, certain minor features of construction combination and arrangement of parts may necessitate alterations to which the patentee is entitled provided such alterations are comprehended within the scope of what is claimed.

What is claimed is:

1. In a dough raiser, a heating compartment, a plurality of metal straps attached to the inner surface of the sides of said heating compartment near its top, a support including a plurality of substantially U-shaped bars having the upper ends of their legs bent to form loops for overhanging said straps, a dough retaining compartment carried by said support, a pair of angle brackets attached to said dough retaining receptacle, plates hingedly connected to said angle brackets and having their upper ends bent to form hooks for over hanging certain of these upper hooked ends of said U-shaped members.

2. In a dough raiser, a heating compartment, a plurality of metal straps attached to the inner surface of the sides of said heating compartment near it stop, a support including a plurality of substantially U-shaped bars having the upper ends of their legs bent to form loops for overhanging said straps, a dough retaining compartment carried by said support, a pair of angle brackets attached to said dough retaining receptacle, plates hingedly connected to said angle brackets and having their upper ends bent to form hooks for over hanging certain of these upper hooked ends of said U-shaped members, a heater supporting bracket carried by the bottom of said heat compartment, and a baffle plate attached to said U-shaped members above said heater supporting bracket.

3. In a dough raiser, a heating compartment, a plurality of metal straps attached to the inner surface of the sides of said heating compartment near its top, a support including a plurality of substantially U-shaped bars having the upper ends of their legs bent to form loops for overhanging said straps, a dough retaining compartment carried by said support, a pair of angle brackets attached to said dough retaining receptacle, plates hingedly connected to said angle brackets and having their upper ends bent to form hooks for overhanging certain of these upper hooked ends of said U-shaped members, a heater supporting bracket carried by the bottom of said heat compartment, and a baffle plate attached to said U-shaped members above said heater supporting bracket, a cover for said heat compartment provided with a plurality of perforations to provide air circulation within the compartment and a cover for said dough retaining receptacle.

4. In a dough raiser, a heating compartment, a plurality of metal straps attached to the inner surface of the sides of said heating compartment near its top, a support including a plurality of substantially U-shaped bars having the upper ends of their legs bent to form loops for overhanging said straps, a dough retaining compartment carried by said support, a pair of angle brackets attached to said dough retaining receptacle, plates hingedly connected to said angle brackets and having their upper ends bent to form hooks for overhanging certain of these upper hooked ends of said U-shaped members, a heater supporting bracket carried by the bottom of said heat compartment, and a baffle plate attached to said U-shaped members above said heater supporting bracket, a cover for said heat compartment provided with a plurality of perforations to provide air circulation within the compartment and a cover for said dough retaining receptacle, and a spider mounted within said dough retaining receptacle and resting upon the bottom thereof to hold a part of the dough within the receptacle from engagement with the bottom of the receptacle.

In testimony whereof I affix my signature in presence of two witnesses.

PAUL C. HAUBOLD.

Witnesses:
JAMES M. MOORE,
R. L. JACKSON.

Copies of this patent may be obtained for five cents each, by addressing the "Commissioner of Patents, Washington, D. C."